United States Patent
Park et al.

(10) Patent No.: US 9,424,105 B2
(45) Date of Patent: Aug. 23, 2016

(54) PREEMPTING TASKS AT A PREEMPTION POINT OF A KERNEL SERVICE ROUTINE BASED ON CURRENT EXECUTION MODE

(71) Applicant: Samsung Electronics Co., Ltd., Suwon-si (KR)

(72) Inventors: Chan-Ju Park, Suwon-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 13/693,028

(22) Filed: Dec. 3, 2012

(65) Prior Publication Data

US 2013/0152096 A1 Jun. 13, 2013

(30) Foreign Application Priority Data

Dec. 7, 2011 (KR) .................. 10-2011-0130407

(51) Int. Cl.
*G06F 9/54* (2006.01)
*G06F 9/48* (2006.01)

(52) U.S. Cl.
CPC .............. *G06F 9/54* (2013.01); *G06F 9/4887* (2013.01)

(58) Field of Classification Search
None
See application file for complete search history.

(56) References Cited

U.S. PATENT DOCUMENTS

| | | | | |
|---|---|---|---|---|
| 5,428,789 A * | 6/1995 | Waldron, III | .................. | 718/103 |
| 5,515,538 A * | 5/1996 | Kleiman | .................. | G06F 9/52 710/260 |
| 5,528,513 A * | 6/1996 | Vaitzblit | ........... | H04L 29/06027 348/E7.073 |
| 5,630,128 A * | 5/1997 | Farrell | .................. | G06F 9/4881 718/103 |
| 5,995,745 A * | 11/1999 | Yodaiken | ............ | G06F 9/45537 703/22 |
| 6,332,163 B1 * | 12/2001 | Bowman-Amuah | ......... | 709/231 |
| 6,457,008 B1 | 9/2002 | Rhee et al. | | |
| 6,760,909 B1 * | 7/2004 | Draves et al. | ................ | 718/102 |
| 7,072,956 B2 | 7/2006 | Parupudi et al. | | |
| 7,165,134 B1 * | 1/2007 | Kardach | ............... | G06F 9/4881 710/260 |
| 7,451,447 B1 * | 11/2008 | Deshpande | ........... | G06F 9/4812 718/102 |

(Continued)

FOREIGN PATENT DOCUMENTS

| | | | |
|---|---|---|---|
| EP | 1 213 648 A1 | | 6/2002 |
| EP | 1 703 388 A2 | | 9/2006 |

(Continued)

OTHER PUBLICATIONS

Extended European Search Report issued on Apr. 17, 2013, in counterpart European Patent Application No. 12196105.6 (8 pages, in English).

*Primary Examiner* — Benjamin Wu
(74) *Attorney, Agent, or Firm* — NSIP Law

(57) ABSTRACT

An apparatus for dynamically controlling a preemption section includes a preemption manager configured to monitor whether a system context has changed, and if the system context has changed, set a current preemptive mode according to the changed system context to dynamically control a preemption section of a kernel. Therefore, even when an application requiring real-time processing, such as a healthcare application, co-exists with a normal application, optimal performance may be ensured.

22 Claims, 7 Drawing Sheets

(56) References Cited

U.S. PATENT DOCUMENTS

| | | | |
|---|---|---|---|
| 2002/0065992 A1* | 5/2002 | Chauvel et al. | 711/141 |
| 2004/0015971 A1* | 1/2004 | Spoltore et al. | 718/102 |
| 2004/0088704 A1* | 5/2004 | Owen et al. | 718/100 |
| 2006/0085793 A1* | 4/2006 | McKenney | G06F 9/526 718/100 |
| 2006/0212869 A1 | 9/2006 | Bril et al. | |
| 2006/0236322 A1* | 10/2006 | Brackman | G06F 9/4806 718/103 |
| 2007/0130567 A1* | 6/2007 | Van Der Veen | G06F 9/526 718/102 |
| 2008/0052716 A1* | 2/2008 | Theurer | G06F 9/4856 718/103 |
| 2008/0104602 A1* | 5/2008 | Takeuchi | G06F 9/4825 718/103 |
| 2009/0049451 A1* | 2/2009 | Bates | G06F 9/461 718/108 |
| 2011/0072180 A1* | 3/2011 | Lee | G06F 13/24 710/260 |
| 2011/0173362 A1* | 7/2011 | Kardashov | G06F 9/5077 710/264 |

FOREIGN PATENT DOCUMENTS

| | | |
|---|---|---|
| JP | 2002-324196 A | 11/2002 |
| KR | 2003-0077696 A | 10/2003 |
| KR | 10-2006-0008896 A | 1/2006 |
| KR | 10-2008-0097819 A | 11/2008 |

* cited by examiner

PREEMPTING TASKS AT A PREEMPTION POINT OF A KERNEL SERVICE ROUTINE BASED ON CURRENT EXECUTION MODE

CROSS-REFERENCE TO RELATED APPLICATIONS

This application claims the benefit under 35 USC 119(a) of Korean Patent Application No. 10-2011-0130407 filed on Dec. 7, 2011, the entire disclosure of which is incorporated herein by reference for all purposes.

BACKGROUND

1. Field

The following description relates to a technique for dynamically controlling a preemption section according to an application or service in an operating system.

2. Description of Related Art

Development of computer technology has been accompanied by evolution of operating systems. Operating systems have been designed to be optimized for specific applications, and can be classified into operating systems for maximizing performance and operating systems for maximizing real-time processing. Examples of operating systems for maximizing performance include Windows, Linux, Android, MacOS, etc., and examples of operating systems for maximizing real-time processing include Nucleus, RTLinux, VxWorks, etc.

With the recent trend of IT convergence, computing environments in which various applications co-exist are expected to be widely used in the future. However, since conventional operating systems have been designed to be optimized for specific purposes, they have a limited ability to satisfy requirements from various applications including applications requiring real-time processing, such as smart cars or personal health equipment, and applications requiring high processing efficiency.

SUMMARY

According to an aspect, an apparatus for dynamically controlling a preemption section includes a preemption manager configured to monitor whether a system context has changed; and if the system context has changed, set a current preemptive mode according to the changed system context to dynamically control a preemption section of a kernel.

The current preemptive mode may be a non preemptive mode, a general preemptive mode, or a fully preemptive mode; and the non preemptive mode, the general preemptive mode, and the fully preemptive mode may be classified according to a degree to which a system context requires real-time processing.

Each of the non preemptive mode, the general preemptive mode, and the fully preemptive mode may be sub-classified into a plurality of preemption levels according to a degree to which a system context requires real-time processing; and the preemption manager may further configured to set a preemptive level for the current preemptive mode among the preemptive levels of the current preemptive mode to dynamically control the preemption section of the kernel.

The apparatus may further include an interrupt context manager configured to dynamically change a method of processing an Interrupt Service Routine (ISR) according to the current preemptive mode.

When a hardware interrupt is generated, the interrupt context may check the current preemptive mode; if the current preemptive mode is a non preemptive mode, the interrupt context manager may cause the ISR to continue to be executed in an interrupt context mode; and if the current preemptive mode is not the non preemptive mode, the interrupt context manager may cause the ISR to be executed in an interrupt thread mode.

The apparatus may further include a preemption point manager configured to dynamically change whether to check whether a current thread needs to be rescheduled when execution of a kernel service routine of the kernel reaches a preemption point in the kernel service routine.

The preemption point may include a code section for checking whether a current thread needs to be rescheduled; and the preemption point manager may be further configured to prevent the code section for checking whether a current thread needs to be rescheduled from being executed or allow the code section for checking whether a current thread needs to be rescheduled to be executed depending on the current preemptive mode.

The preemption point manager may be further configured to, when the execution of the kernel service routine reaches the preemption point, determine whether the current preemptive mode is a non preemptive mode; if a result of the determining is that the current preemptive mode is the non preemptive mode, prevent the code section for checking whether a current thread needs to be rescheduled from being executed; and if a result of the determining is that the current preemptive mode is not the non preemptive mode, allow the code section for checking whether a current thread needs to be rescheduled to be executed.

The apparatus may further include a preemptive lock manager configured to, when the kernel executes a task having spin lock, dynamically cause the kernel to execute the task using a spin lock or a mutex according to the current preemptive mode.

The apparatus may further include a preemptive IPC/SysCall manager configured to, when an Inter-Process Communication (IPC) is processed, dynamically control a timeout of the IPC according to the current preemptive mode; and when a system call is generated, cause the system call to be executed synchronously or asynchronously according to the current preemptive mode.

The IPC/SysCall manager may be further configured to determine whether the current preemptive mode is a non preemptive mode; if a result of the determining is that the current preemptive mode is the non preemptive mode, cause the system call to be executed asynchronously; and if a result of the determining is that the current preemptive mode is not the non preemptive mode, cause the system call to be executed synchronously.

The apparatus may further include a preemptive HW manager configured to set a Translation Lookaside Buffer (TLB) lockdown dynamically according to the current preemptive mode so that a task requiring real-time processing is not flushed from the TLB.

According to an aspect, a method of dynamically controlling a preemption section includes monitoring whether a system context has changed; and if the system context has changed, setting a current preemptive mode according to the changed system context to dynamically control a preemption section of a kernel.

The current preemptive mode may be a non preemptive mode, a general preemptive mode, or a fully preemptive mode; and the non preemptive mode, the general preemptive mode, and the fully preemptive mode may be classified according to a degree to which a system context requires real-time processing.

Each of the non preemptive mode, the general preemptive mode, and the fully preemptive mode may be sub-classified into a plurality of preemption levels according to a degree to which a system context requires real-time processing; and the setting of a current preemptive mode may include setting a preemptive level for the current preemptive mode among the preemptive levels of the current preemptive mode to dynamically control the preemption section of the kernel.

The method may further include dynamically changing a method of processing an Interrupt Service Routine (ISR) according to the current preemptive mode.

The dynamically changing of the method of processing the ISR may include, when a hardware interrupt is generated, checking the current preemptive mode; if the current preemptive mode is a non preemptive mode, causing the ISR to continue to be executed in an interrupt context mode; and if the current preemptive mode is not the non preemptive mode, causing the ISR to be executed in an interrupt thread mode.

The method may further include dynamically changing whether to check whether a current thread needs to be rescheduled when execution of a kernel service routine reaches a preemption point in the kernel service routine.

The preemption point may include a code section for checking whether a current thread needs to be rescheduled; and the dynamically changing of whether to check whether a current thread needs to be rescheduled may include preventing the code section for checking whether a current thread needs to be rescheduled from being executed or allowing the code section for checking whether a current thread needs to be rescheduled to be executed depending on the current preemptive mode.

The preventing or allowing may include, when the execution of the kernel service routine reaches the preemption point, determining whether the current preemptive mode is a non preemptive mode; if a result of the determining is that the current preemptive mode is the non preemptive mode, preventing the code section for checking whether a current thread needs to be rescheduled from being executed; and if a result of the determining is that the current preemptive mode is not the non preemptive mode, allowing the code section for checking whether a current thread needs to be rescheduled to be executed.

The method may further include, when the kernel executes a task having a spin lock, dynamically causing the kernel to execute the task using a spin lock or a mutex according to the current preemptive mode.

The method may further include, when an Inter-Process Communication (IPC) is processed, dynamically controlling a time-out of the IPC according to the current preemptive mode; and when a system call is generated, causing the system call to be executed synchronously or asynchronously according to the current preemptive mode.

The causing the system call to be executed synchronously or asynchronously may include determining whether the current preemptive mode is a non preemptive mode; if a result of the determining is that the current preemptive mode is a non preemptive mode, causing the system call to be executed asynchronously; and if a result of the determining is that the current preemptive mode is not the non preemptive mode, causing the system call to be executed synchronously.

The method may further include setting a Translation Lookaside Buffer (TLB) lockdown dynamically according to the current preemptive mode so that a task requiring real-time processing is not flushed from the TLB.

Other features and aspects will be apparent from the following detailed description, the drawings, and the claims.

DETAILED DESCRIPTION

Figure 1:
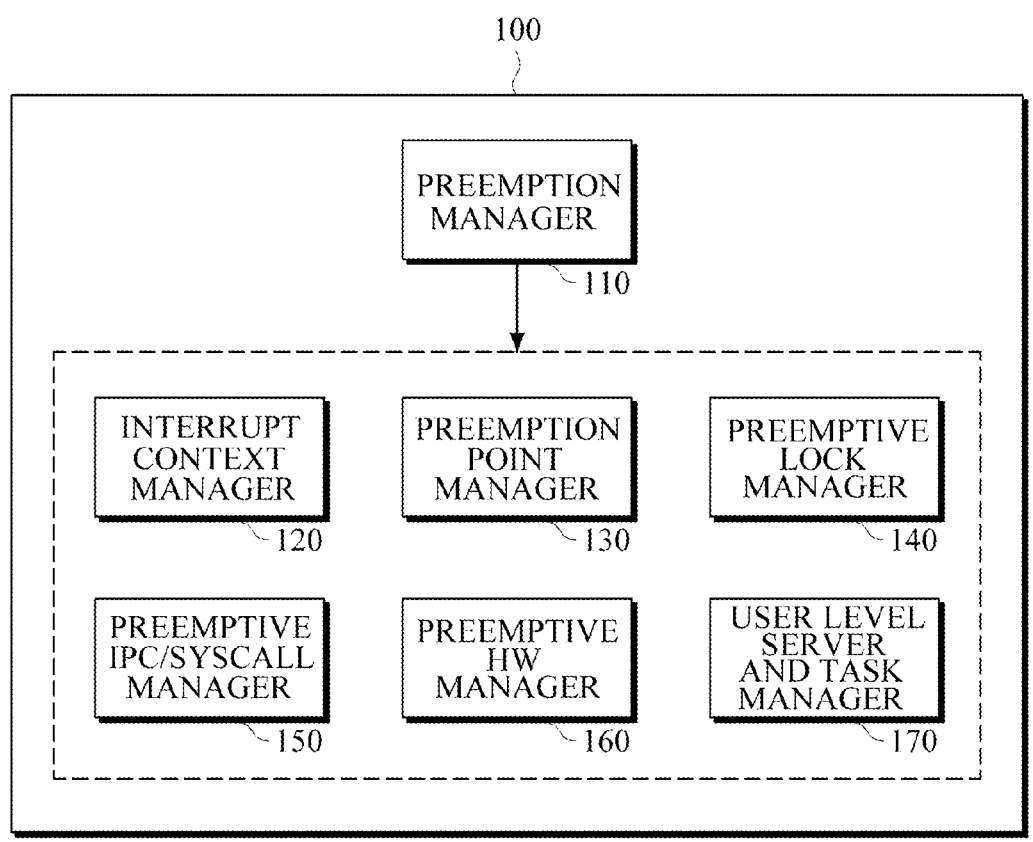
FIG. 1 is a diagram illustrating an example of an apparatus for dynamically controlling a preemption section in an operating system.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and structures that are well known to one of ordinary skill in the art may be omitted for increased clarity and conciseness.

Throughout the drawings and the detailed description, the same drawing reference numerals refer to the same elements. The relative size and depiction of these elements may be exaggerated for clarity, illustration, and convenience.

FIG. 1 is a diagram illustrating an example of an apparatus 100 for dynamically controlling a preemption section in an operating system. The apparatus 100 may be hardware, software, or a combination of hardware and software, and the individual components of the apparatus 100 shown in FIG. 1, i.e., various managers 110, 120, 130, 140, 150, 160, and 170 that are described in detail below may be implemented as hardware components, software components, or components that are a combination of hardware and software.

As shown in FIG. 1, the apparatus 100 for dynamically controlling a preemption section includes a preemption manager 110. A preemption section in an operating section is a section of the operating system in which a process currently being executed may be preempted under certain conditions to enable another process to be executed. The preemption manager 110 monitors whether a current system context has changed. If the preemption manager 110 determines that the current system context has changed, the preemption manager 110 sets a current preemptive mode according to the changed system context to control a preemption section of a kernel. The system context may include a user preference, a device context (for example, the states of a device and sensor), a service context (for example, a current QoS (Quality of Service)), a peripheral environment (for example, a real-time task, a system overhead, a location, etc.), and so on. That is, the preemption manager 110 determines in which preemptive mode the kernel is to operate according to the system context. For example, the preemptive manager 110 may be implemented to be operable on a user layer or on a kernel layer according to the architecture of the kernel.

In greater detail, the preemption manager 110 monitors whether a system context has changed, such as when a real-time task has been registered or when a device context has changed, and sets a current preemptive mode that is suitable to the changed system context. Preemptive modes may be broadly classified into three stages of a non preemptive mode, a general preemptive mode, and a fully preemptive mode according to a degree to which real-time processing is required. However, this classification is only an example, and preemptive modes may be classified into a predetermined number of stages in advance by a user or a developer according to a degree to which a system context (that is, applications, tasks, interrupts, etc.) that is processed by a system requires real-time processing.

The non preemptive mode may be set in an environment in which an application, such as an embedded server or a data streaming application, requiring high processing efficiency rather than real-time processing is being executed.

The general preemptive mode may be set in an environment in which a general application, such as a multimedia application, a game, etc., is being executed together with an application requiring normal real-time processing.

The fully preemptive mode may be set in an environment in which an application, such as health-care monitoring, driver monitoring, car-crash alarm, etc., in which real-time processing is much more important than processing efficiency is being executed.

If the total available resources that an operating system can use during the preemption section are assumed to be 100%, the fully preemptive mode may be set to use 100% of the available resources during the preemption section, the general preemptive mode may be set to use 80% of the available resources during the preemption section, and the non preemptive mode may be set to use 20% of available resources during the preemption section. Thus, by variously classifying preemptive modes according to the types of system contexts, it is possible to optimally meet requirements of various application environments in various operating systems. However, the specific percentages listed above are merely examples, and other percentages may be used depending on the particular situation.

Each of the non preemptive mode, the general preemptive mode, and the fully preemptive mode may be sub-classified into several preemption levels. That is, applications may have different degrees of requirements for real-time processing although they are all set to the fully preemptive mode allowing 100% use of the available resources during a preemption section. For example, the fully preemptive mode may be sub-classified into several preemption levels (for example, in units of 1%, 5% or 10%) within a range of 80% to 100% according to degrees of requirements for real-time processing. Similarly, the general preemptive mode may be sub-classified into several preemption levels (for example, in units of 1%, 5% or 10%) within a range of 20% to 80% according to degrees of requirements for balancing real-time processing and processing efficiency. Also, the non preemptive mode may be sub-classified into several preemption levels (for example, in units of 1%, 5% or 10%) within a range of 0% to 20% according to degrees of requirements for processing efficiency. The preemption manager 110 may set a current preemptive mode and may further set a preemption level for the current preemptive mode to dynamically control a preemption section of a kernel. However, the specific percentages listed above are merely examples, and other percentages may be used depending on the particular situation.

The apparatus 100 for dynamically controlling a preemption section may further include an interrupt context manager 120. The interrupt context manager 120 dynamically changes a method of processing an Interrupt Service Routine (ISR) according to a current preemptive mode set by the preemption manager 110. In more detail, when a hardware interrupt is generated, the interrupt context manager 120 checks a current preemptive mode, and allows the ISR to continue to be performed in an interrupt context mode if the current preemptive mode is the non preemptive mode. If the current preemptive mode is not the non preemptive mode, e.g., if the current preemptive mode is the general preemptive mode or the fully preemptive mode, the interrupt context manager 120 causes the ISR to be performed in an interrupt thread mode.

When a specific interrupt is applied to a system, the interrupt branches to an interrupt vector set by hardware, and an interrupt preprocessor performs an operation of identifying the current preemptive mode in the interrupt context mode. The interrupt vector is a space having addresses of interrupt service routines capable of processing a generated interrupt. If the current preemptive mode is the non preemptive mode, the ISR is processed in the interrupt context mode since the non preemptive mode is for an environment where real-time processing is not important. However, if the current preemptive mode is the general preemptive mode or the fully preemptive mode, an interrupt thread is scheduled so that the ISR is processed in the interrupt thread mode and then ISR is processed in the interrupt thread mode. When an interrupt thread is used, an interrupt is itself processed as a thread so that the interrupt can be preempted at any time and a schedule change based on priority is also allowed. Accordingly, although more overhead that negatively impacts processing efficiency may be required in the interrupt thread mode, a high level of real-time processing can be ensured.

The apparatus 100 for dynamically controlling a preemption section may further include a preemption point manager 130. The preemption point manager 130 dynamically changes, depending on a current preemptive mode, whether to check whether a current thread needs to be rescheduled at a preemption point that has been inserted into a kernel service routine. The preemption point may be inserted into a start portion of a kernel service routine requiring a long execution time, and may include a code section for checking whether a current thread needs to be rescheduled.

When execution of the kernel service routine reaches the preemption point, the preemption point manager 130 determines whether a current preemptive mode is the non preemptive mode. If a result of the determination is that the current preemptive mode is the non preemptive mode, the preemption point manager 130 prevents the kernel service routine from executing the code section for checking whether a current thread needs to be rescheduled, causing the kernel service routine to continue the execution of a current thread. If a result of the determination is that the current preemptive mode is not the non preemptive mode, i.e., is the fully preemptive mode or the general preemptive mode, the preemption point manager 130 allows the kernel service routine to execute the code section for checking whether a current thread needs to be rescheduled. As a result, when the current preemptive mode is the non preemptive mode, whether a current thread needs to be rescheduled is not determined, thereby improving processing efficiency at the expense of real-time processing.

The apparatus 100 for dynamically controlling a preemption section may further include a preemptive lock manager 140. The preemptive lock manager 140 uses, when a kernel executes a task having a spin lock, either a spin lock or a mutex (mutual exclusion) dynamically according to a current preemptive mode set by the preemption manager 110 to process the task. A spin lock continues to check a lock and waits until the lock is released by another thread. A mutex is a technique for independently executing threads having critical sections so that the execution times of the threads do not overlap each other. Lock and Unlock are used to control accesses of multiple processors to sharing resources. A spin lock and a mutex are well known in the art, and therefore will not be described in detail here for conciseness.

The preemptive lock manager 140 may use, if a current preemptive mode is the fully preemptive mode, a mutex instead of a spin lock. This allows, when a low priority task having a spin lock is being executed, a task requiring real-time processing to preempt the low priority task so that the task requiring real-time processing is executed prior to the low priority task. However, since a mutex requires overhead that negatively impacts processing efficiency, when a current preemptive mode is set to the non preemptive mode by the preemption manager 110, the preemption lock manager 140 may change a mutex code section to point to a spin lock code section to enter a busy waiting state. Accordingly, a task requiring no or limited real-time processing may use a spin lock, which has a relatively excellent performance in terms of processing efficiency.

The apparatus 100 for dynamically controlling a preemption section may further include a preemptive IPC/SysCall manager 150. The preemptive IPC/SysCall manager 150 dynamically controls, when an Inter-Process Communication (IPC) is processed, a time-out of the IPC according to a current preemptive mode set by the preemption manager 110, or dynamically controls, when a system call (SysCall) is executed, whether to execute the system call synchronously or asynchronously according to the current preemptive mode.

For example, the preemptive IPC/SysCall manager 150 may determine, when a system call is executed, if a current task is a task requiring real-time processing. That is, if a current preemptive mode set by the preemption manager 110 is the fully preemptive mode, indicating that the current task is a task requiring real-time processing, the preemptive IPC/SysCall manger 150 may cause the system call to be executed asynchronously, while if the current preemptive mode is the non preemptive mode, indicating that the current task is a task requiring no or limited real-time processing, the preemptive IPC/SysCall manager 150 may cause the system call to be executed synchronously.

The apparatus 100 for dynamically controlling a preemption section may further include a preemptive HW (hardware) manager 160. The preemptive HW manager 160 may set or release a Translation Lookaside Buffer (TLB) lockdown dynamically so that a task requiring real-time processing, which is determined according to a current preemptive mode set by the preemption manager 110, is not flushed from a TLB. Also, the preemptive HW manager 160 may pin a time-critical memory page so that no page fault is generated in the real-time task. A TLB is a limited hardware resource for reducing page table translation overhead that is generated when the virtual addresses of an operating system and an application are converted into physical addresses. Since a TLB flush operates according to an internal algorithm, a TLB flush generated at a moment at which real-time processing is important may generate latency. Accordingly, if a current preemptive mode is the fully preemptive mode, the preemptive HW manager 160 may perform a dynamic TLB lockdown for an application requiring real-time processing so that the application will always be included in a TLB. A TLB, a TLB flush, and a TLB lockdown are well known in the art, and therefore will not be described in detail here for conciseness.

The apparatus 100 for dynamically controlling a preemption section may further include a user level server and task manager 170. The user level server and task manager 170 controls, when a current preemptive mode is set by the preemption manager 110, the execution methods of a preempter, an interrupt thread, a pager, a scheduler, etc., of a user layer dynamically according to the current preemptive mode.

Figure 2:
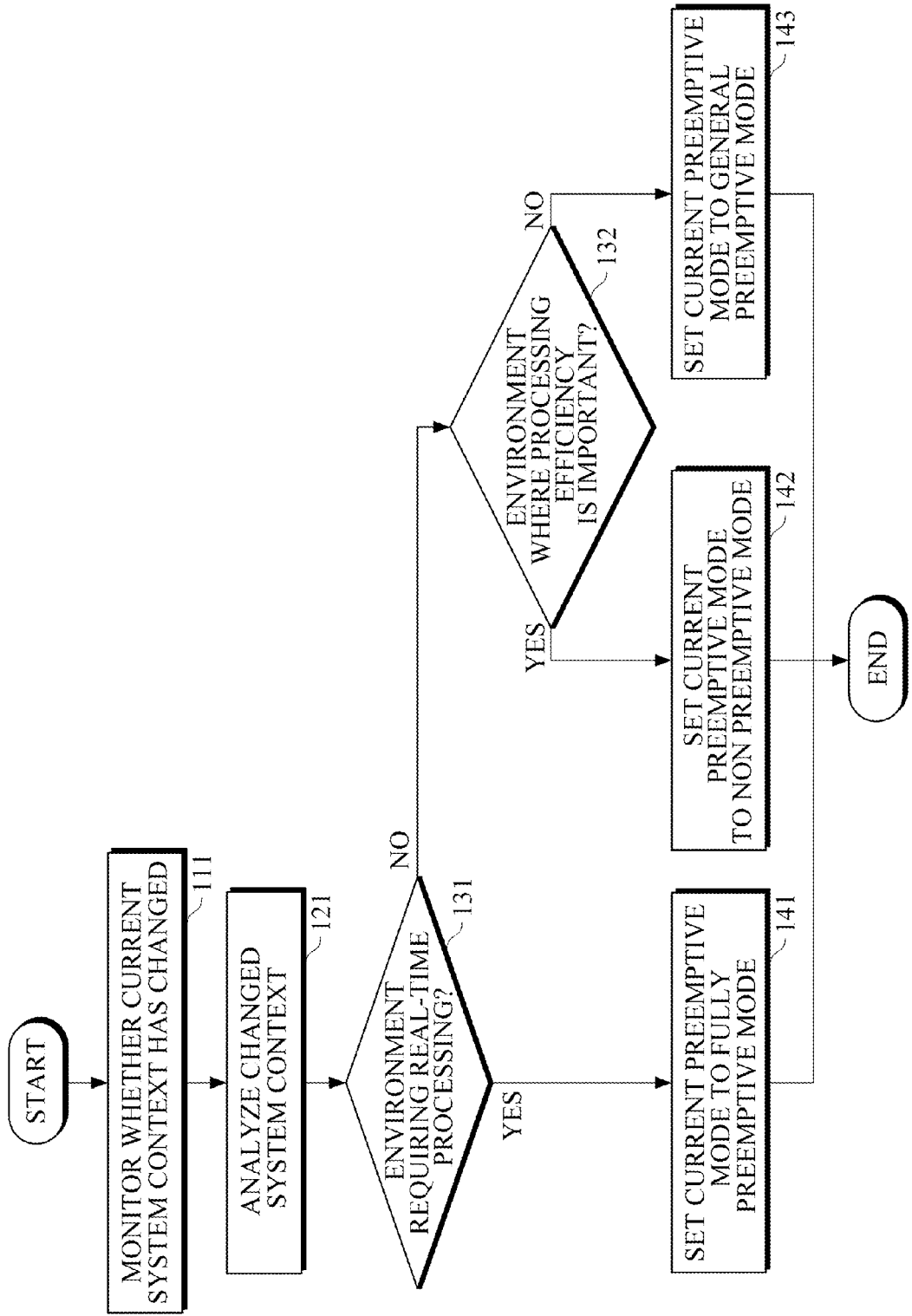
FIG. 2 is a flowchart illustrating an example of a method for dynamically controlling a preemption section in an operating system.

FIG. 2 is a flowchart illustrating an example of a method of dynamically controlling a preemption section in an operating system. The method of dynamically controlling a preemption section will be described in detail with reference to FIGS. 1 and 2. First, the preemption manager 110 monitors whether a current system context has changed (111). If it is determined that the current system context has changed, the preemption manager 110 analyzes the changed system context (121). Then, the preemption manager 110 determines in (131) whether the changed system context is an environment in which real-time processing is much more important than processing efficiency, like when an application such as health-care monitoring, driver monitoring, car-crash alarm, etc., is being executed. If the result of the determination in (131) is that the changed system context is an environment in which real-time processing is much more important than processing efficiency, the preemption manager 110 sets a current preemptive mode to the fully preemptive mode (141).

If the result of the determination in (131) is that the changed system context is not an environment in which real-time processing is much more important than processing efficiency, the preemption manager 110 determines in (132) whether the changed system context is an environment, such as an embedded server or a data streaming application, in which an application requiring high processing efficiency rather than real-time processing is being executed. If result of the determination in (132) is that the changed system context is an environment in which an application requiring high processing efficiency rather than real-time processing is being executed, the preemption manager 110 sets a current preemptive mode to the non preemptive mode (142).

If a result of the determination in (132) is that the changed system context is not an environment in which an application requiring high processing efficiency rather than real-time processing is being executed, the preemption manager 110 sets a current preemptive mode to the general preemptive mode (143).

As described above, each of the fully preemptive mode, the non preemptive mode, and the general preemptive mode may be sub-classified into several preemption levels according to the type of the system context. In greater detail, when a changed system context is a general environment, i.e., neither an environment requiring critical real-time processing nor an environment requiring very high processing efficiency, that is, when the changed system context is an environment where various applications co-exist, the general preemptive mode may be sub-classified into various preemption levels.

Figure 3:
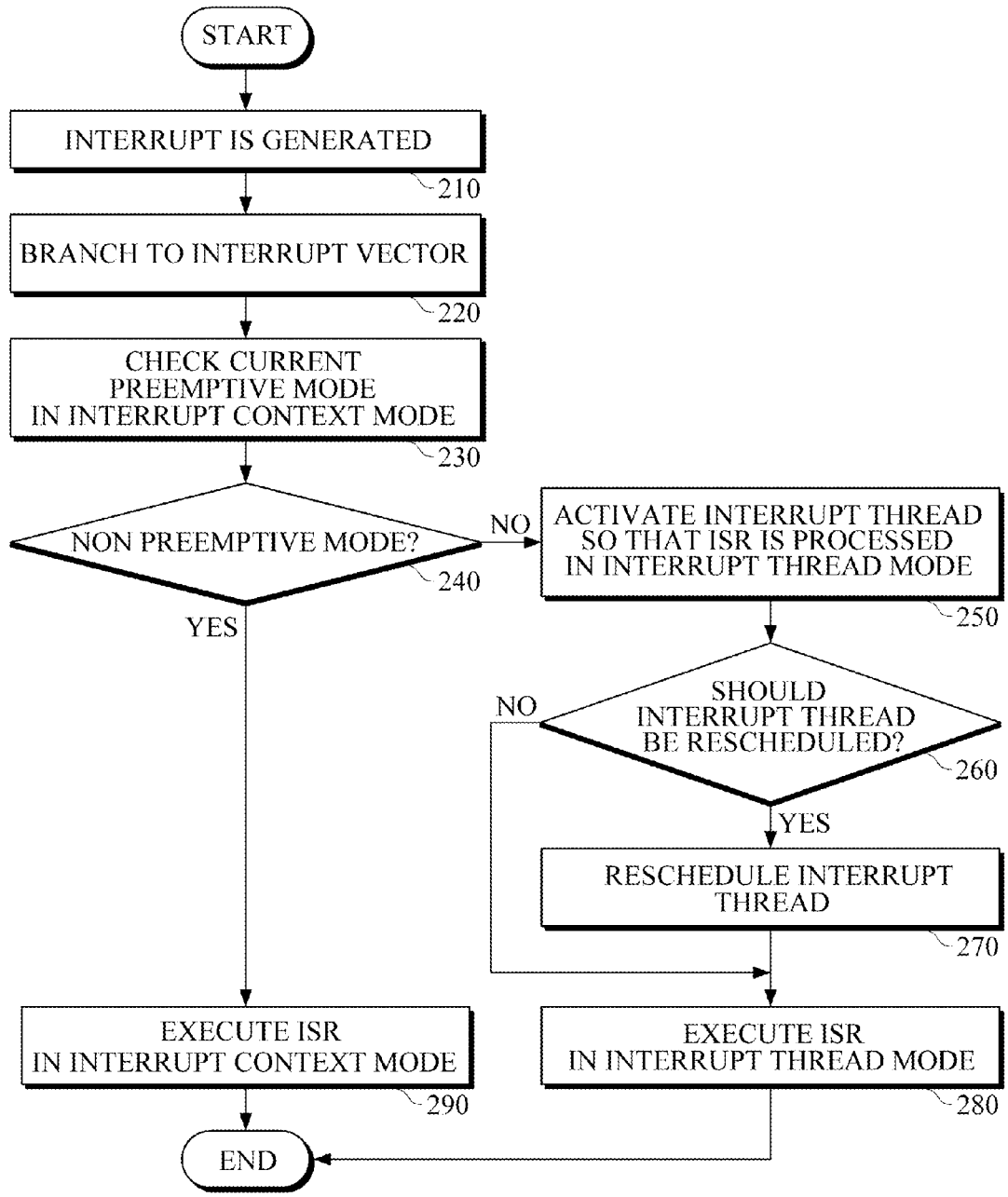
FIG. 3 is a flowchart illustrating an example of a method of dynamically controlling Interrupt Service Routine (ISR) processing.

FIG. 3 is a flowchart illustrating an example of a method of dynamically controlling Interrupt Service Routine (ISR) processing. A method of dynamically controlling ISR processing according to a current preemptive mode will be described in detail with reference to FIGS. 1 and 3. First, when an interrupt is generated in hardware (210) during execution, the execution branches to an interrupt vector (220). Then, the interrupt context manager 120 checks a current preemptive mode in an interrupt context mode (230), and determines in (240) whether the current preemptive mode is the non preemptive mode.

If the result of the determination in (240) is that the current preemptive mode is the non preemptive mode, indicating an environment where real-time processing is not important, the interrupt context manager 240 causes the ISR to be processed in the interrupt context mode (290).

If the result of the determination in (240) is that the current preemptive mode is not the non preemptive mode, i.e., is either the general preemptive mode or the fully preemptive mode, the interrupt context manager 120 activates an interrupt thread to cause the ISR to be processed in an interrupt thread mode (250). Then, the operating system determines in (260) whether the interrupt thread needs to be rescheduled according to priority.

If it is determined in (260) that the interrupt thread needs to be rescheduled, the interrupt thread is rescheduled (270), and then the ISR is executed in an interrupt thread mode (280) at an appropriate time according to the rescheduling.

If it is determined in (260) that the interrupt thread does not need to be rescheduled according to priority, the ISR is executed in the interrupt thread mode (280).

Accordingly, as described above, when an interrupt thread is used, an interrupt is itself processed as a thread so the interrupt can be preempted at any time and a schedule change based on priority is also allowed. Accordingly, although more overhead that negatively impacts processing efficiency may be required in the interrupt thread mode, a high level of real-time processing can be ensured.

Figure 4:
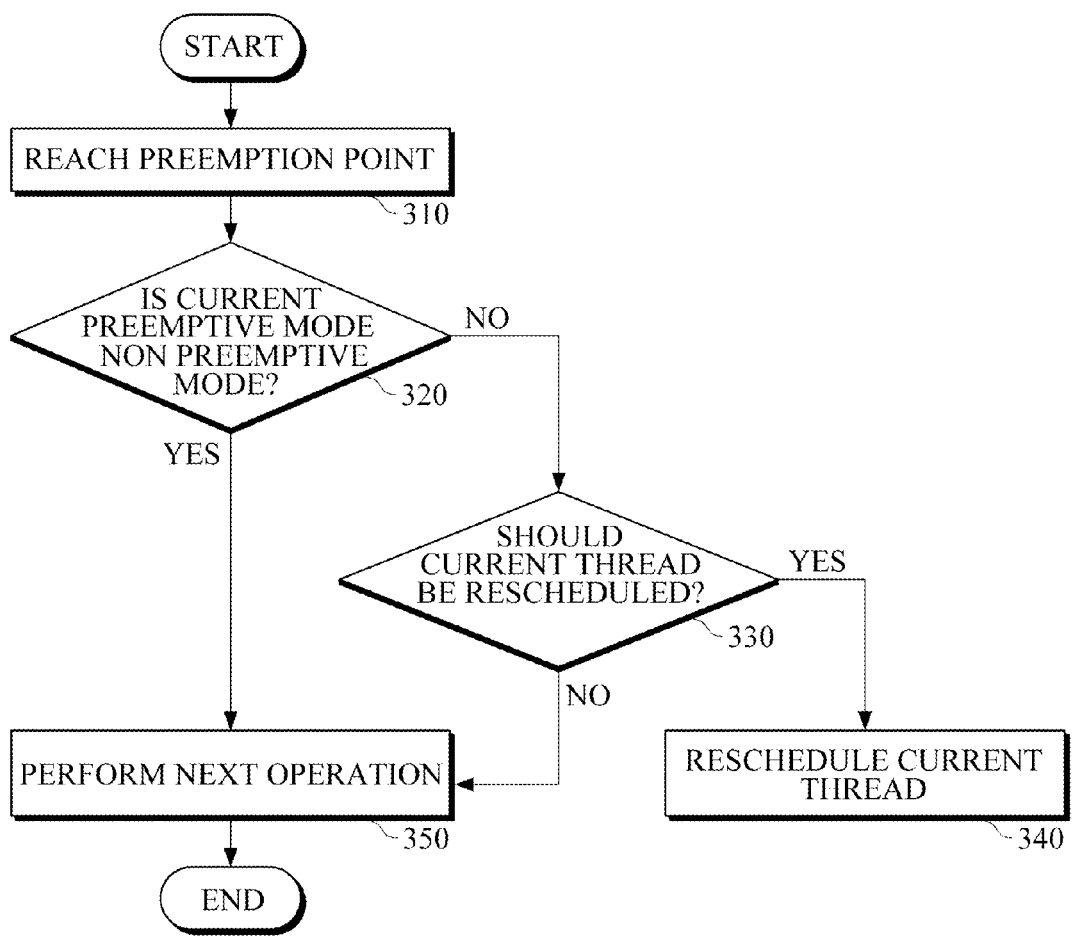
FIG. 4 is a flowchart illustrating an example of a method of dynamically controlling a preemption point execution procedure.

FIG. 4 is a flowchart illustrating an example of a method of dynamically controlling a preemption point execution procedure. Referring to FIGS. 1 and 4, a preemption point for may be inserted into a start part of a kernel service routine requiring a long execution time. The preemption point may include a code section for checking whether a current thread needs to be rescheduled. When execution of the kernel service routine reaches the preemption point (310), the preemption point manager 130 determines in (320) whether a current preemptive mode is the non preemptive mode.

If a result of the determination in (320) is that the current preemptive mode is the non preemptive mode, the preemption point manager 130 prevents the kernel service routine from executing the code section for checking whether a current thread needs to be rescheduled, causing the kernel service routine to continue executing a current thread and perform the next operation (350).

If a result of the determination in (320) is that the current preemptive mode is not the non preemptive mode, i.e., is the fully preemptive mode or the general preemptive mode, the preemption point manager 130 allows the kernel service routine to execute the code section for checking whether a current thread needs to be rescheduled (330).

If a result of the checking in (330) is that the current thread needs to be rescheduled, the kernel service routine reschedules the current thread (340).

If a result of the checking in (350) is that the current thread does not need to be rescheduled, the kernel service routine continues to execute the current thread and performs a next operation (350).

Accordingly, as described above, if a current preemptive mode is the non preemptive mode, whether a current thread needs to be rescheduled is not determined, thereby improving processing efficient at the expense of real-time processing.

Figure 5:
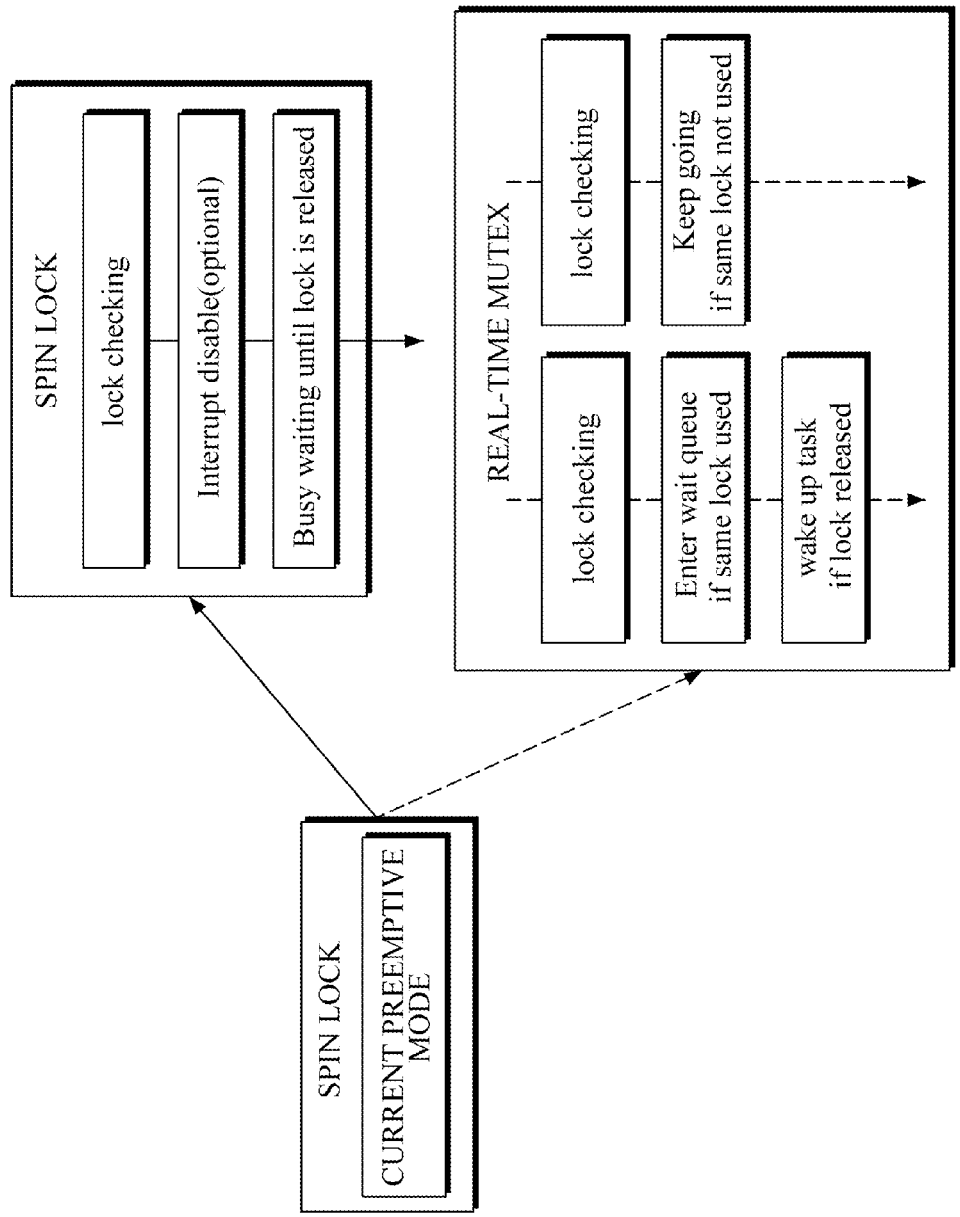
FIG. 5 is a diagram for explaining an example of a method of dynamically controlling a system lock method.

FIG. 5 is a diagram for explaining an example of dynamically controlling a system lock method. Referring to FIGS. 1 and 5, when a kernel executes a task having a spin lock, the preemptive lock manager 140 may make the kernel execute the task using either a spin lock or a mutex dynamically according to a current preemptive mode. For example, if the current preemptive mode is the fully preemptive mode, the preemptive lock manager 140 may cause the kernel to use a mutex instead of a spin lock. That is, if a task requiring real-time processing is input while a kernel is executing a low priority task having a spin lock, the preemptive lock manager 140 may cause the kernel to execute the task requiring real-time processing prior to the low priority task. Since a mutex requires overhead that negatively impacts processing efficiency, when a current preemptive mode is set to the non preemptive mode by the preemption manager 110, the preemption lock manager 140 may change a mutex code section to point to a spin lock code section to enter a busy waiting state since a spin lock has a relatively excellent performance in terms of processing efficiency. The specific details of a spin lock and a mutex shown in FIG. 5 are well known in the art, and therefore will not be described here for conciseness.

Figure 6:
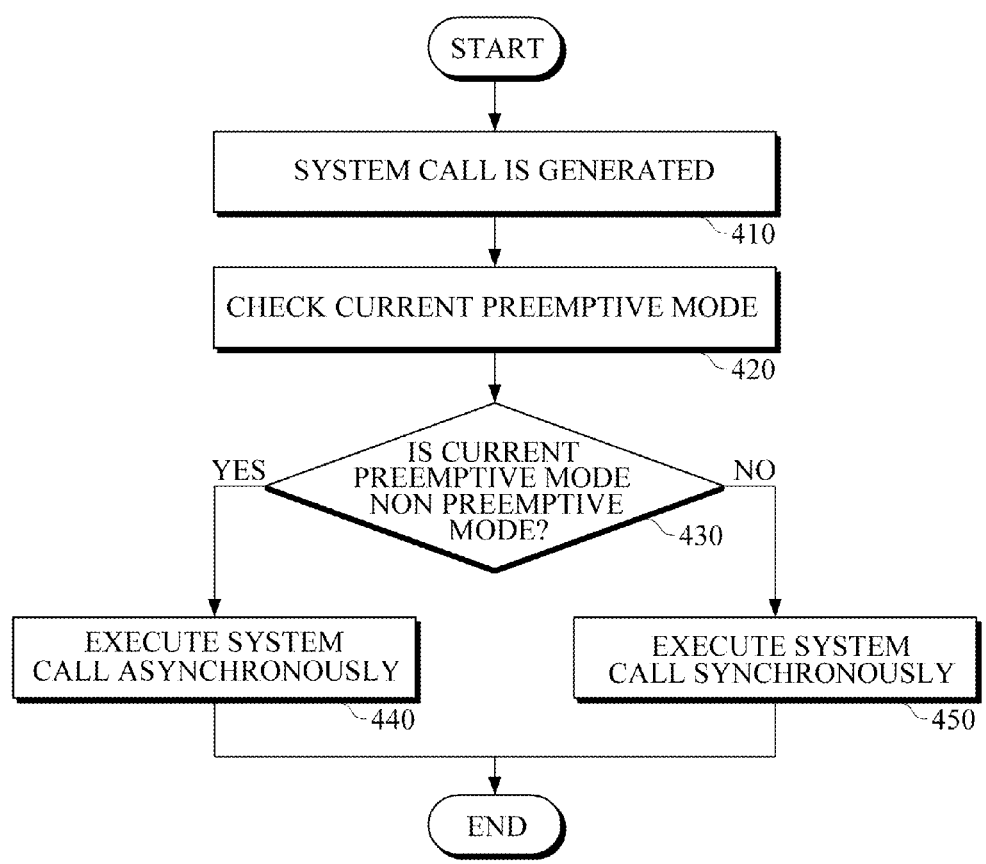
FIG. 6 is a flowchart illustrating an example of a method of dynamically controlling a system call execution method.

FIG. 6 is a flowchart illustrating an example of a method of dynamically controlling a system call execution method. When an Inter-Process Communication (IPC) is processed, the preemptive IPC/SysCall manager 150 dynamically controls a time-out of the IPC according to a current preemptive mode. Also, when a system call is executed, the preemptive IPC/SysCall manager 150 causes the system call to be executed synchronously or asynchronously according to a current preemptive mode.

Referring to FIG. 6, a procedure of executing a system call according to a current preemptive mode will be described in detail. First, when a system call is generated (410), the preemptive IPC/SysCall manager 150 checks a current preemptive mode (420). Then, the preemptive IPC/SysCall manager 150 determines in (430) whether the current preemptive mode is the non preemptive mode.

If a result of the determination in (430) is that the current preemptive mode is the non preemptive mode, indicating that a task currently being performed is a task requiring real-time processing, the preemptive IPC/SysCall manager 150 causes the system call to be executed asynchronously (440).

If a result of the determination in (430) is that the current preemptive mode is not the non preemptive mode, i.e., is the fully preemptive mode or the general preemptive mode, the preemptive IPC/SysCall manager 150 causes the system call to be executed synchronously (450).

Figure 7:
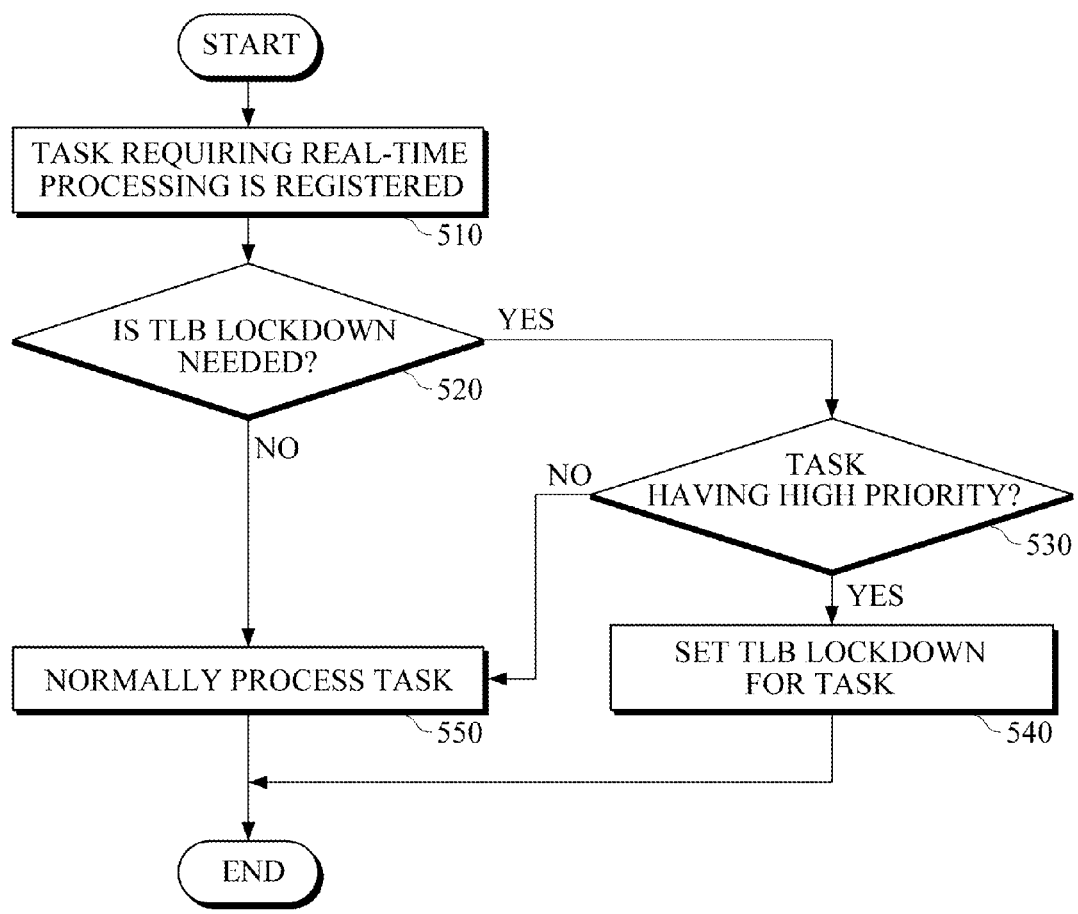
FIG. 7 is a flowchart illustrating an example of a method of dynamically setting a Translation Lookaside Buffer (TLB) lockdown.

FIG. 7 is a flowchart illustrating an example of a method of dynamically setting a TLB lockdown. Referring to FIGS. 1 and 7, the preemptive HW manager 160 sets or releases a TLB lockdown dynamically according to a current preemptive mode so that a task requiring real-time processing is not flushed from a TLB. Also, the preemptive HW manager 160 may pin a time-critical memory page so that no page fault is generated in a task requiring real-time processing.

In greater detail, in the method of dynamically setting a TLB lockdown, when a task requiring real-time processing is registered (510), the preemptive HW manager 160 determines in (520) whether a TLB lockdown is needed by determining whether a current preemptive mode is the non preemptive mode.

If a result of the determination in (520) is that the current preemptive mode is the non preemptive mode, the preemptive HW manager 160 causes the task requiring real-time processing to be processed normally (550).

If a result of the determination in (520) is that the current preemptive mode is not the non preemptive mode, i.e., is the fully preemptive mode or the general preemptive mode, the preemptive HW manager 160 determines in (530) whether the task requiring real-time processing has a high priority so that important applications or tasks requiring real-time processing can be always included in a TLB.

If a result of the determination in (530) is that the task requiring real-time processing has a high priority, the preemptive HW manager 160 sets a TLB lockdown for the task requiring real-time processing (540).

If a result of the determination in (530) is that the task requiring real-time processing does not have a high priority, the preemptive HW manager 160 causes the task requiring real-time processing to be processed normally without setting a TLB lockdown for the task requiring real-time processing (550).

The various managers 110, 120, 130, 140, 150, 160, and 170 in FIG. 1 may be implemented using one or more hardware components, one or more software components, or a combination of one or more hardware components and one or more software components.

A hardware component may be, for example, a physical device that physically performs one or more operations, but is not limited thereto. Examples of hardware components include arithmetic elements, operational elements, functional elements, registers, buses, memory devices, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the block diagram in FIG. 1 and the flow diagrams in FIGS. 2-7 and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for dynamically controlling a preemption section of a kernel, wherein the preemption section is a section of the kernel in which a process currently being executed may be preempted to enable another process to be executed, the apparatus comprising:
    a processor;
    a preemption manager configured to:
        monitor whether a system context has changed; and
        upon determining that the system context has changed, set a current preemptive mode according to the changed system context to dynamically control the preemption section of the kernel, wherein the current preemptive mode determines whether the apparatus will prioritize processing efficiency or real-time processing; and
    a preemption point manager configured to determine, upon reaching a preemption point in execution of a kernel service routine of the kernel, whether to check whether a current thread needs to be rescheduled, based on the current preemptive mode; and upon determining that the current thread needs to be rescheduled, reschedule the current thread.

2. The apparatus of claim 1, wherein the current preemptive mode is one of a non preemptive mode, a general preemptive mode, or a fully preemptive mode; and
    the non preemptive mode, the general preemptive mode, and the fully preemptive mode are classified according to a degree to which the system context requires real-time processing.

3. The apparatus of claim 2, wherein each of the non preemptive mode, the general preemptive mode, and the fully preemptive mode is sub-classified into a plurality of preemption levels according to a degree to which the system context requires real-time processing; and
    the preemption manager is further configured to set a preemptive level for the current preemptive mode among the preemptive levels of the current preemptive mode to dynamically control the preemption section of the kernel.

4. The apparatus of claim 1, further comprising an interrupt context manager configured to dynamically change a method of processing an Interrupt Service Routine (ISR) according to the current preemptive mode.

5. The apparatus of claim 4, wherein, when a hardware interrupt is generated, the interrupt context checks the current preemptive mode;
    if the current preemptive mode is a non preemptive mode, the interrupt context manager causes the ISR to continue to be executed in an interrupt context mode; and
    if the current preemptive mode is not the non preemptive mode, the interrupt context manager causes the ISR to be executed in an interrupt thread mode.

6. The apparatus of claim 1, wherein the preemption point comprises a code section for checking whether a current thread needs to be rescheduled; and
    the preemption point manager is further configured to prevent the code section for checking whether a current thread needs to be rescheduled from being executed or allow the code section for checking whether a current thread needs to be rescheduled to be executed depending on the current preemptive mode.

7. The apparatus of claim 6, wherein the preemption point manager is further configured to, when the execution of the kernel service routine reaches the preemption point:
    determine whether the current preemptive mode is a non preemptive mode;
    if a result of the determining is that the current preemptive mode is the non preemptive mode, prevent the code section for checking whether a current thread needs to be rescheduled from being executed; and
    if a result of the determining is that the current preemptive mode is not the non preemptive mode, allow the code section for checking whether a current thread needs to be rescheduled to be executed.

8. The apparatus of claim 1, further comprising a preemptive lock manager configured to, when the kernel executes a task having spin lock, dynamically cause the kernel to execute the task using a spin lock or a mutex according to the current preemptive mode.

9. The apparatus of claim 1, further comprising a preemptive IPC/SysCall manager configured to:
    when an Inter-Process Communication (IPC) is processed, dynamically control a time-out of the IPC according to the current preemptive mode; and
    when a system call is generated, cause the system call to be executed synchronously or asynchronously according to the current preemptive mode.

10. The apparatus of claim 9, wherein the IPC/SysCall manager is further configured to:
    determine whether the current preemptive mode is a non preemptive mode;
    if a result of the determining is that the current preemptive mode is the non preemptive mode, cause the system call to be executed asynchronously; and
    if a result of the determining is that the current preemptive mode is not the non preemptive mode, cause the system call to be executed synchronously.

11. The apparatus of claim 1, further comprising a preemptive hardware (HW) manager configured to set a Translation Lookaside Buffer (TLB) lockdown dynamically according to the current preemptive mode so that a task requiring real-time processing is not flushed from the TLB.

12. A method of dynamically controlling a preemption section of a kernel, wherein the preemption section is a section of the kernel in which a process currently being executed may be preempted to enable another process to be executed, the method comprising:

monitoring whether a system context has changed;

upon determining that the system context has changed, setting a current preemptive mode according to the changed system context to dynamically control the preemption section of the kernel, wherein the current preemptive mode determines whether processing efficiency or real-time processing will be prioritized; and determining, upon reaching a preemption point in execution of a kernel service routine of the kernel, whether to check whether a current thread needs to be rescheduled, based on the current preemptive mode; and upon determining that the current thread needs to be rescheduled, reschedule the current thread.

13. The method of claim 12, wherein the current preemptive mode is one of a non preemptive mode, a general preemptive mode, or a fully preemptive mode; and the non preemptive mode, the general preemptive mode, and the fully preemptive mode are classified according to a degree to which the system context requires real-time processing.

14. The method of claim 13, wherein each of the non preemptive mode, the general preemptive mode, and the fully preemptive mode is sub-classified into a plurality of preemption levels according to a degree to which the system context requires real-time processing; and the setting of the current preemptive mode comprises setting a preemptive level for the current preemptive mode among the preemptive levels of the current preemptive mode to dynamically control the preemption section of the kernel.

15. The method of claim 12, further comprising dynamically changing a method of processing an Interrupt Service Routine (ISR) according to the current preemptive mode.

16. The method of claim 15, wherein the dynamically changing of the method of processing the ISR comprises:

when a hardware interrupt is generated, checking the current preemptive mode;

if the current preemptive mode is a non preemptive mode, causing the ISR to continue to be executed in an interrupt context mode; and if the current preemptive mode is not the non preemptive mode, causing the ISR to be executed in an interrupt thread mode.

17. The method of claim 12, wherein the preemption point comprises a code section for checking whether a current thread needs to be rescheduled; and the determining of whether to check whether a current thread needs to be rescheduled comprises preventing the code section for checking whether a current thread needs to be rescheduled from being executed or allowing the code section for checking whether a current thread needs to be rescheduled to be executed depending on the current preemptive mode.

18. The method of claim 17, wherein the preventing or allowing comprises, when the execution of the kernel service routine reaches the preemption point:

determining whether the current preemptive mode is a non preemptive mode;

if a result of the determining is that the current preemptive mode is the non preemptive mode, preventing the code section for checking whether a current thread needs to be rescheduled from being executed; and if a result of the determining is that the current preemptive mode is not the non preemptive mode, allowing the code section for checking whether a current thread needs to be rescheduled to be executed.

19. The method of claim 12, further comprising, when the kernel executes a task having a spin lock, dynamically causing the kernel to execute the task using a spin lock or a mutex according to the current preemptive mode.

20. The method of claim 12, further comprising:

when an Inter-Process Communication (IPC) is processed, dynamically controlling a time-out of the IPC according to the current preemptive mode; and when a system call is generated, causing the system call to be executed synchronously or asynchronously according to the current preemptive mode.

21. The method of claim 20, wherein the causing the system call to be executed synchronously or asynchronously comprises:

determining whether the current preemptive mode is a non preemptive mode;

if a result of the determining is that the current preemptive mode is the non preemptive mode, causing the system call to be executed asynchronously; and if a result of the determining is that the current preemptive mode is not the non preemptive mode, causing the system call to be executed synchronously.

22. The method of claim 12, further comprising setting a Translation Lookaside Buffer (TLB) lockdown dynamically according to the current preemptive mode so that a task requiring real-time processing is not flushed from the TLB.

* * * * *